United States Patent

[11] 3,586,463

| [72] | Inventor | Jean Charles Marchadour |
| | | 40, rue P. Borrossi, 29 Quimper, France |
| [21] | Appl. No. | 830,037 |
| [22] | Filed | June 3, 1969 |
| [45] | Patented | June 22, 1971 |
| [32] | Priority | June 12, 1968 |
| [33] | | France |
| [31] | | 154,745 |

[54] FILLING AND METERING DEVICE FOR USE IN CANNING
5 Claims, 2 Drawing Figs.

[52] U.S. Cl. .................................................. 417/437, 417/515
[51] Int. Cl. ...................................................F04b 27/00, F04b 13/00
[50] Field of Search........................................... 417/515, 437; 230/170; 103/153, 227, 228

[56] References Cited
UNITED STATES PATENTS
2,032,163  2/1936  Bagby........................... 103/227

FOREIGN PATENTS
416,448  10/1910  France ........................ 417/515

Primary Examiner—Henry F. Raduazo
Attorney—Arnold Robinson

ABSTRACT: The invention relates to an improvement in filling and metering devices for use in canning. Previous proposals use the same conduit as an inlet conduit and an outlet conduit and this presents difficulties in operation. It is also an object of the invention to have a circular path for the cans being filled as short as possible whilst minimizing centrifugal force and to accommodate all the necessary mechanisms whilst keeping the filling orifice as near the center of the filling machine as possible. These objects are realized by using a metering piston and a separate stripping cylinder with a piston constituting a closure valve, the metering cylinder having an outlet chamber which has a plug and socket inlet and an outlet conduit communicating with the stripping cylinder, the outlet orifice of the outlet conduit being wholly above the adjacent end face of the metering piston at the level reached by the piston in its wholly retracted position within its cylinder.

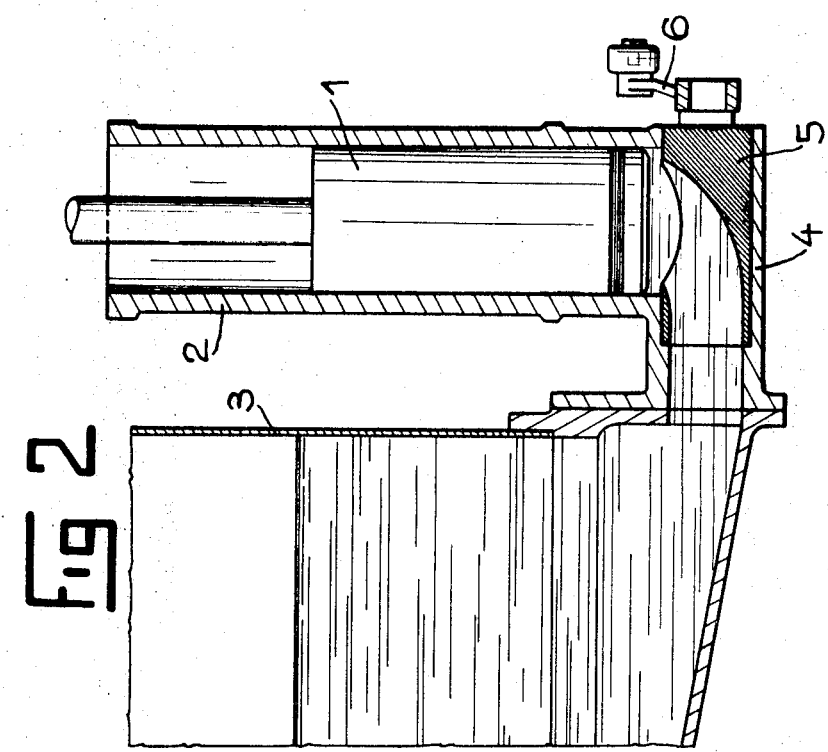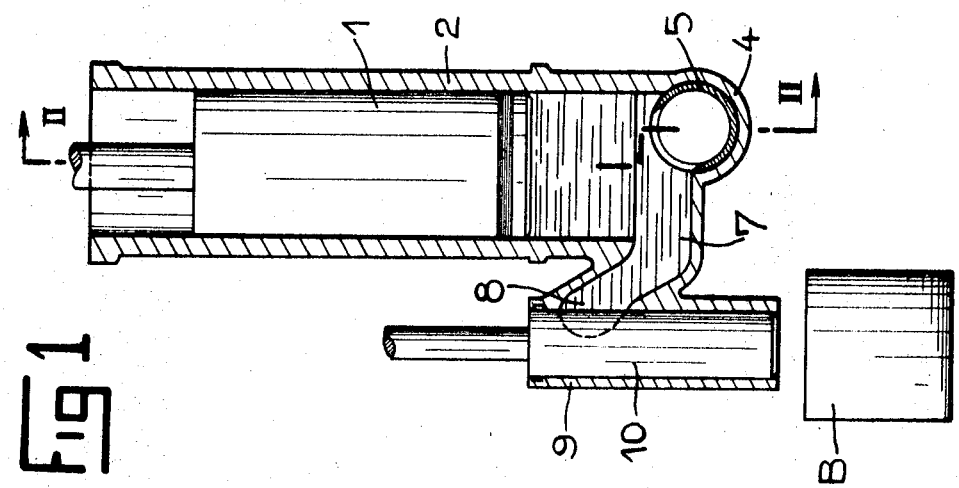

FILLING AND METERING DEVICE FOR USE IN CANNING

This invention relates to filling and metering devices for use in canning and is particularly concerned with devices of the kind in which the cans to be filled are displaced along a circular path.

In this kind of filling device, it is desirable for the path of movement of the cans to be short and such that they are not subjected to centrifugal force. Furthermore, in order that the device may comprise all the necessary mechanisms whilst maintaining the inlet orifice adjacent to the center, it is desirable to avoid the common practice in which the metering device comprises a conduit which acts both as an inlet and as an outlet conduit.

It is an object of the invention therefore to provide a metering device which is particularly suited to this kind of filling operation but which also comprises various improvements allowing accurate metering and filling.

The invention accordingly provides a metering device for filling preserve cans which comprises a metering piston with a cylinder which opens into a chamber comprising a lower inlet conduit having an inlet socket with a rotary closure plug and an outlet conduit feeding into a stripping cylinder with a piston constituting a closure valve, the orifice communicating between the outlet conduit and the stripping cylinder being wholly above the low point of travel of the metering piston.

Further features of the invention will be clear from the following particular description with reference to the accompanying drawing.

Accordingly, the invention is now particularly described, for illustration purposes only, with reference to the accompanying drawing in which:

FIG. 1 is an axial section of one constructional form of metering device according to the invention.

FIG. 2 is a section along the line II-II in FIG. 1.

The metering device shown in FIGS. 1 and 2 comprises a piston 1 movable in a cylinder 2 fed by a tank 3 through a socket pipe 4 with a closure plug 5 rotatable by means of a handle 6. When the plug 5 is in its open position, the socket pipe 4 communicates under the metering piston 1 with a chamber 7 forming a part of the cylinder 2 below the lower point of travel of the piston 1. The chamber 7 communicates through a conduit 8 with a stripping cylinder 9 provided with a piston 10 which in its lower position masks the conduit 8 and strips the cylinder 9 of any material remaining therein, feeding such remaining material into a can B.

The conduit 8 is arranged so that its inlet orifice is substantially tangent to the lower end face of the piston when the latter is at its lower dead point whilst the outlet orifice of the conduit 8 communicating with the cylinder 9 is entirely above the horizontal level corresponding to this position of the piston 1. This arrangement prevents any air bubble from being trapped below the piston, thereby rendering inaccurate the metering operation.

The device just described operates as follows: In a first stage, the piston 10 closes the conduit 8 and the plug 5 is in its open position. The piston 1 then draws into the cylinder 2 a required amount of material. The plug 5 then closes the socket pipe 4 and the piston 10 travels upwards in its cylinder 9 so as to unmask the conduit 8 allowing the metered material to be fed by the piston 1 in its downward travel through the conduit 8 and via the cylinder 9 into the box 8.

At the end of this feeding stage, the piston 10 returns downwards so as to close the conduit 8 and to strip the cylinder 9 of any material remaining therein, thereby completing the filling of the can B.

The invention is not limited to be constructional form particularly described above and illustrated in the accompanying drawing but includes in its scope obvious modifications thereon.

I claim:

1. Metering and filling apparatus for canning a selected material which comprises a metering cylinder having an inlet and an outlet therein, first movable piston means in said cylinder adapted to move in one direction relative to said inlet to fill the cylinder with a selected amount of material and to move in a second direction relative to said outlet to dispense such material from the cylinder through the outlet, valve means for closing the inlet of the metering cylinder while the material is being dispensed and for opening the inlet for filling the metering cylinder, a stripping cylinder having an inlet and an outlet therein, a conduit that connects the inlet of the stripping cylinder with the outlet of the metering cylinder to convey the dispensed material from the metering cylinder to the stripping cylinder, second movable piston means in said stripping cylinder adapted to move in one direction to open the inlet of the stripping cylinder when the material is being dispensed from the metering cylinder through said conduit and into said stripping cylinder and to move in a second direction to dispense and strip material from said stripping cylinder and to close the inlet of the stripping cylinder and the conduit while the metering cylinder is being filled and the valve means open.

2. The structure specified in claim 1 in which the valve means include a socket pipe and a rotatable closure plug for said socket pipe.

3. The structure specified in claim 1 in which the metering and stripping cylinders are both vertically disposed and in which the inlet to said stripping cylinder is located above the outlet from said metering cylinder.

4. The structure specified in claim 3 in which the inlet to said stripping cylinder is positioned above the lowest point of travel reached by said first piston means in dispensing material from said metering cylinder.

5. The structure specified in claim 3 in which the top of the outlet of the metering cylinder is located adjacent the lowest point of travel reached by said first piston means in dispensing material from said metering cylinder.

Disclaimer 3,586,463.—*Jean Charles Marchadour*, Quimper, France. FILLING AND METERING DEVICE FOR USE IN CANNING. Patent dated June 22, 1971. Disclaimer filed Oct. 12, 1976, by the inventor.
Hereby enters this disclaimer to claims 1 and 2 of said patent.
[*Official Gazette January 11, 1977.*]